J. P. RIGSBY.
SYNCHRONISM INDICATOR.
APPLICATION FILED JUNE 15, 1918.
1,389,382.
Patented Aug. 30, 1921.
2 SHEETS—SHEET 1.
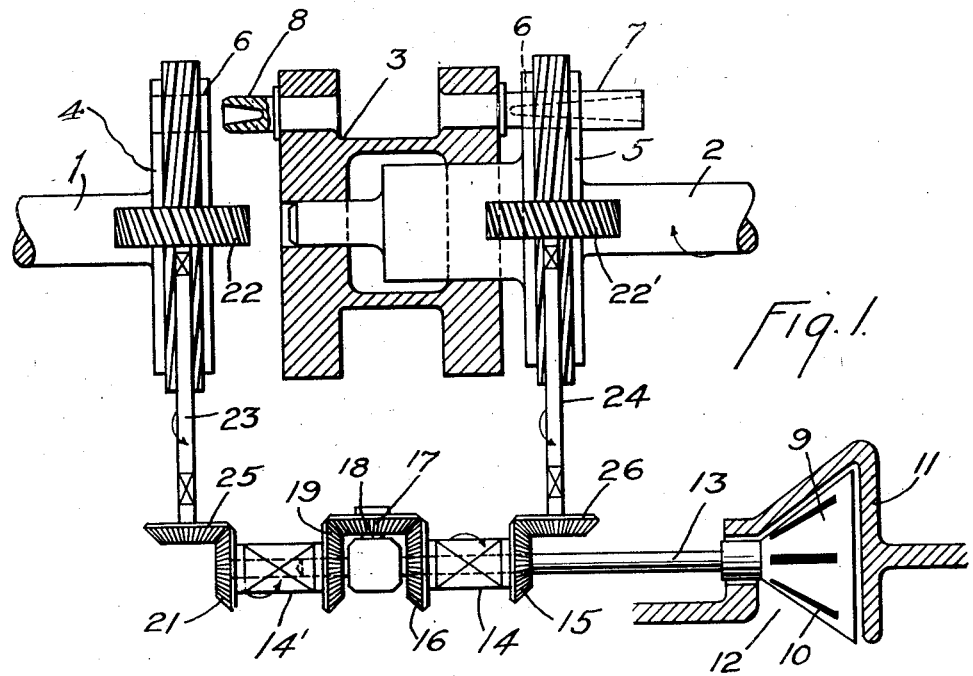
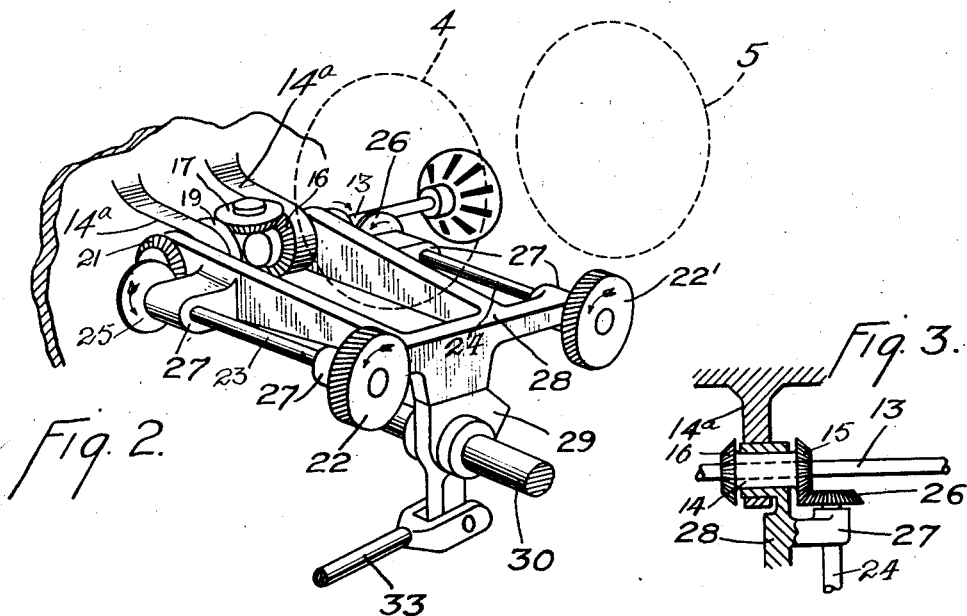
INVENTOR.
John P. Rigsby
BY
ATTORNEYS.

J. P. RIGSBY.
SYNCHRONISM INDICATOR.
APPLICATION FILED JUNE 15, 1918.

1,389,382.

Patented Aug. 30, 1921.
2 SHEETS—SHEET 2.

WITNESSES:

INVENTOR.
John P. Rigsby
BY
ATTORNEYS.

UNITED STATES PATENT OFFICE.

JOHN P. RIGSBY, OF EDGEWOOD, PENNSYLVANIA, ASSIGNOR TO WESTINGHOUSE ELECTRIC & MANUFACTURING COMPANY, A CORPORATION OF PENNSYLVANIA.

SYNCHRONISM-INDICATOR.

1,389,382.   Specification of Letters Patent.   Patented Aug. 30, 1921.

Application filed June 15, 1918. Serial No. 240,261.

*To all whom it may concern:*

Be it known that I, JOHN P. RIGSBY, a subject of the King of Great Britain and Ireland, and a resident of Edgewood, in the county of Allegheny and State of Pennsylvania, have made a new and useful Invention in Synchronism-Indicators, of which the following is a specification.

This invention relates to synchronism indicators for determining when two or more independently rotating shafts are rotating synchronously and has its particular application in connection with clutch mechanism for connecting the driving shafts of two or more turbines or other prime movers, and particularly such driving connections as are in general use in coupling up marine propeller shafts with two or more turbines or engines.

Marine propellers are frequently driven by a main turbine connected by suitable reduction gearing or otherwise to the propeller shaft and by a "cruising turbine" alined with the main turbine and adapted to be connected with the main turbine shaft by means of a suitable clutch having interengaging clutch jaws, teeth or other co-acting driving elements. It is usually necessary to couple the cruising turbine shaft with the main turbine shaft while the propeller is being rotated by the main turbine, and if the clutch should be moved into engaging position before the rotary speeds of the turbine shafts had become nearly equal, or until the shafts were rotating synchronously, the clutch would be stripped or the machinery injured.

This invention has for its principal objects the production of a synchronism indicator that will readily indicate the moment at which the two shafts are rotating with equal angular velocity, so that the operator may determine the proper moment for moving the clutch into operative position; the production of an indicator for the above purpose having a rotary visible indicator that is adapted to come to a state of rest when the propeller shaft and the cruising turbine shaft are rotating synchronously, regardless of the speed of the shafts; the production of an indicator that can readily be moved into or out of operative position with respect to the driving shafts; the production of an indicator for the above purpose that occupies a minimum of space and is easily manipulated; the production of an indicator having a dial with such characteristics that the operator can readily determine the approach of the state of synchronous rotation of the driving shafts, and such other objects as may hereinafter appear. One embodiment of the invention is illustrated in the accompanying drawings, wherein—

Figure 1 is a bottom plan view of the indicator and the driving mechanism therefor, showing a portion of the clutch mechanism in cross section.

Fig. 2 is a perspective view of the indicating mechanism showing its relation with the shaft gears which are indicated in broken lines.

Fig. 3 is a horizontal section through a detail of the construction of the driving mechanism.

Figure 5:
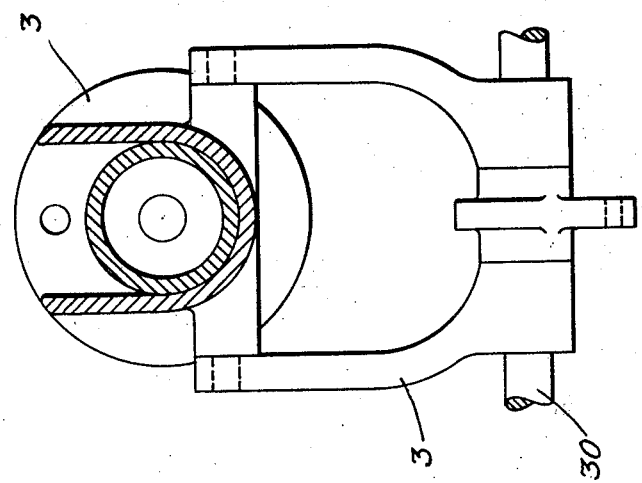
Fig. 5 is an end elevation of the mechanism shown in Fig. 4, the clutch being sectioned on the line V—V of Fig. 4.

Briefly the indicating mechanism comprises a rotary visible indicator suitably supported and having a differential driving gear connected to the turbine shafts by gearing carried upon an oscillating frame which is adapted to be oscillated about the axis of the indicator shaft so as to disengage the driving connection from the turbine shafts. Through the medium of the differential gearing the indicator shaft is caused to rotate when the driving shafts have relative rotary movements and come to rest when the driving shafts are rotating synchronously.

Referring to the drawings; 1 is the main turbine shaft, 2 the cruising turbine shaft, upon which is slidably mounted a clutch 3. The end of the main shaft 1 is provided with a worm wheel 4, and the end of the cruising shaft is provided with a worm wheel 5, each of which is provided with holes 6 through which the teeth of the clutch 3 are adapted to project. As shown, the clutch 3 is provided with a series of extended teeth or projections 7, one of which is shown, which remain in engagement with the worm 5 at all times. The clutch is also provided with a series of shorter teeth or projections 8, one of which is shown, adapted to project through the holes 6 in the worm wheel 4 when the clutch 3 is moved toward the left (see Fig. 1).

It will be seen from the foregoing that when the clutch 3 is moved toward the left upon the shaft 2, the tooth 8 will enter the hole 6 of the worm wheel 4, thereby establishing a driving connection between the cruising shaft 2 and the main shaft 1. Any preferred form of clutch mechanism may be used that will releasably connect the cruiser turbine shaft with the main turbine shaft, and the specific clutch mechanism shown is not a part of the invention.

It is usually necessary to engage the clutch members while the main shaft is rotating and this engagement of the clutch must be accomplished at a time when the cruising shaft 2 is rotating at practically the same speed as the main shaft 1; otherwise the teeth 8 and 7 would be broken or the machinery otherwise damaged. In order to determine when the two shafts are rotating synchronously, or practically at the same speed, an indicating device is provided, which consists of a conical indicator dial 9 provided with contrasting radial markings 10 suitably spaced upon the dial so that they can be readily distinguished when the dial is revolving at comparatively low velocity. When the dial is turning at a high velocity, indicating relative speeds of the turbine shafts unfavorable to the clutching operation, the markings of the dial colors apparently blend or merge one into the other so as to produce a dial appearing to have a single color.

The dial is protected by a housing 11, which is provided with an opening 12 through which the dial is visible. The openings should preferably be wider than two of the radial markings on the dial so that it will be possible to see more than one at a time.

The dial is mounted upon the end of a horizontal shaft 13, which is journaled in sleeves 14 and 14'. Beveled gears 15 and 16 are rigidly mounted on the sleeve 14, and similarly arranged gears 21 and 19 are rigidly mounted on the sleeve 14'. Each sleeve is journaled in a bearing formed in a frame 28 and the frame is pivotally mounted on brackets 14ᵃ as is shown in Figs. 2 and 3. A pin 18 is rigidly secured to that portion of the shaft 13 extending between the sleeves 14 and 14' and a beveled gear 17 is journaled on this pin and meshes with the gears 16 and 19.

The gears 21 and 15 are adapted to be driven by the main shaft 1 and the cruising shaft 2 respectively through means of worm wheels 22 and 22' mounted upon the driving shafts 23 and 24 respectively. These shafts have secured to their ends beveled gears 25 and 26 respectively which are adapted to mesh respectively with beveled gears 21 and 15.

The shafts 23 and 24 are adapted to be driven in the same direction by the worm wheels 4 and 5 of the turbine shafts and thereby cause the gears 21 and 15 to be rotated in opposite directions, as will be seen in Fig. 1. Therefore the gears 19 and 16 will be driven in opposite directions and it will be seen that if these last named gears are turning at the same velocity, the pinion or planetary gear 17 will rotate without turning the shaft 13. If, however, the gear 16 should be rotating slower than the gear 19, the gear 17 would roll around the gear 16, and thereby rotate the shaft 13. The same action would take place in case the gear 19 would be rotated at a lower velocity than the gear 16 except that the shaft 13 would be rotated in the reverse direction. It will be seen from the foregoing that any difference in the velocities of the two turbine shafts will cause rotation of the indicator dial 9, and as the speeds of the turbine shafts 1 and 2 gradually approach synchronous rotation, the speed of the indicator dial 9 will be reduced and when the turbine shafts are finally rotating synchronously, the indicator dial 9 will come to rest.

It is one of the objects of this invention to provide a synchronism indicator that may be put into service only when it is desired to operate the clutch so that the mechanism will not be operated at all times. For this purpose, the driving shafts 23 and 24 are mounted in bearings 27 upon a frame or cage 28, which is pivoted to the supports 14 axially of the indicator shaft 13. The method of making this connection is clearly illustrated in Fig. 3. The frame 28 is adapted to be oscillated toward and from the worm wheels 4 and 5 mounted upon the turbine shafts, so as to engage and disengage the teeth of the worm wheels 22 with or from the teeth of the worm wheels 4 and 5.

For the purpose of holding the worm wheels 22 into engagement with the worm wheels 4 and 5, a cam 29 is provided which is mounted upon any suitable supporting shaft 30. This cam 29 is adapted to engage the underside of the frame 28 (Fig. 2) so that when the cam is rotated counterclockwise, the frame 28 will be raised carrying the gears 22 into engagement with the worm wheels 4 and 5. When the indicator mechanism is no longer required the cam 29 may be rotated clockwise so as to lower the gears 22 away from the worm wheels 4 and 5.

Figure 4:
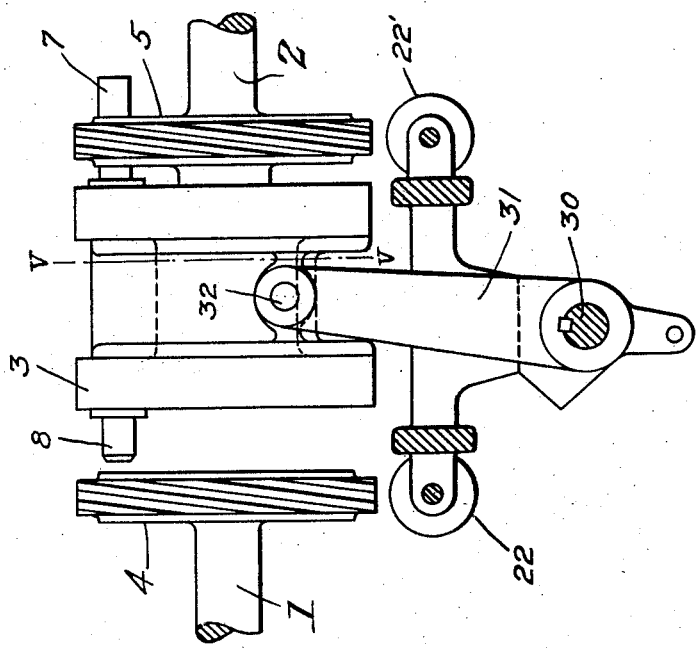
Fig. 4 is a side elevation of the clutch and a portion of the indicating mechanism.

Referring to Figs. 4 and 5, it will be seen that the clutch 3 is adapted to be operated by means of a yoke 31, having its outer end pivoted at 32 to the clutch 3. This yoke is preferably mounted upon the shaft 30 and is keyed thereto. The shaft 30 is adapted to be rocked or oscillated by any suitable operating mechanism, not shown.

The operation of the device is as follows: Assuming that the indicating mechanism is in its lowered or inoperative position, as indicated in Fig. 2, and it is desired to connect the cruising turbine with the main turbine, the cam 29 is first rotated counterclockwise by movement of the rod 33. This action will throw into mesh the gears 22 and 22' with the worm wheels 4 and 5 respectively and cause the operation of the indicating mechanism. As previously stated, when the turbine shafts are rotating synchronously, the indicating dial will come to rest and the radial marks on the dial will be clearly distinguishable, and it is at this moment that the operator should actuate the yoke 31 to throw the clutch 3 into engagement with the worm wheel 4. There will be no danger of stripping the projections from the clutch if the clutch is operated when the indicator is at rest because the turbine shafts will then be rotating at practically the same velocity.

While I have described and illustrated but one embodiment of my invention, it will be apparent to those skilled in the art that various modifications, changes, additions and omissions may be made in the apparatus described and illustrated, as set forth by the appended claims.

What I claim is:

1. A device for indicating synchronous movement of independently rotating shafts comprising a rotary indicator responsive to relative rotary movement of the said shafts, a driving shaft for the indicator, differential gearing in driving connection with the indicator shaft and having driving gears therefor mounted in axial alinement with the indicator shaft, and a driving connection connecting the driving gears with the rotating shafts, pivoted axially of the indicator shaft, so that the driving connection may be moved into and out of operative engagement with the said rotating shafts.

2. A device for indicating synchronous movement of independently rotating shafts, comprising a rotary indicator responsive to relative rotary movement of the said shafts, an indicator shaft, driving gears therefor mounted axially thereof, a supporting cage pivoted axially of the indicator shaft for oscillatory movement, and gear means for driving the indicator, carried by the cage, so that it will operatively engage the said driving gears and mesh therewith during oscillation, the said gear means adapted to be moved into and out of operative engagement with the said rotating shafts when the cage is oscillated.

3. A device for indicating synchronous movement of independently rotating shafts, comprising a rotary indicator responsive to relative rotary movement of the said shafts, an indicator shaft, driving gears therefor mounted axially thereof, a supporting cage pivoted axially of the indicator shaft for oscillatory movement, gear means for driving the indicator, carried by the cage, so that it will operatively engage the said driving gears and mesh therewith during oscillation of the cage, adapted to be moved into and out of operative engagement with the said rotary shafts when the cage is oscillated, and means for holding the gear means in operative and inoperative positions.

4. A device for indicating synchronous movement of independently rotating shafts, comprising a support, a cage pivoted to said support for oscillatory movement, a pair of gear members journaled concentrically of the axis of rotation of the cage, an indicator having a driving shaft axially alined with the said gear members, a planetary gear for driving the said indicator mounted for revolution about the axis of said gears and responsive to variations in speed of rotation of the said gears, gear means mounted on the cage constantly in operative engagement with the said gears and adapted to be moved into and out of operative engagement with the said rotating shafts when the cage is oscillated.

5. A device for indicating synchronous movement of independently rotating shafts, comprising a support, a cage pivoted to the said support for oscillatory movement, independent gear elements on the cage, each adapted to operatively connect with a different rotating shaft, the said elements being adapted to be moved into and out of operative engagement with their respective shafts by oscillatory movement of the cage, differential gearing elements journaled axially of the axis of rotation of the cage and constantly in operative engagement with the said gear elements, and having a revoluble member responsive to variations in speed of the differential gearing elements engaging the said gear elements, an indicator and a driving connection between the said revoluble member and the said indicator.

In testimony whereof I have hereunto subscribed my name this 13th day of June, 1918.

JOHN P. RIGSBY.

Witness:
C. W. McGHEE.